Patented Apr. 1, 1952

2,590,910

UNITED STATES PATENT OFFICE 2,590,910

ROSIN ACID ESTERS

Harold Wittcoff and John Robert Roach, Minneapolis, Minn., assignors to General Mills., Inc., a corporation of Delaware No Drawing. Application May 8, 1947, Serial No. 746,855

2 Claims. (Cl. 260—104)

The present invention relates to rosin acid esters, and more particularly to rosin acid esters of highly functional condensation products of pentaerythritol and glycerol monohalohydrin.

It is a primary object of the present invention to provide rosin acid esters of high melting point, produced by the esterification reaction between a rosin acid and a highly hydroxylated composition resulting from the condensation of pentaerythritol and glycerol monohydrin.

The esters of the present invention are produced from rosin acids and highly hydroxylated condensation products prepared by the condensation of pentaerythritol with glycerol monochlorohydrin. The ratio of reactants can be varied such that anywhere from a single mole of glycerol monochlorohydrin may be caused to react with a mole of pentaerythritol, or such that up to 10 moles, but preferably from 2-4 moles, of the monochlorohydrin may be employed per mole of pentaerythritol. Likewise any ratio between these two limits may be employed. In this way all or part of the hydroxyl groups of the pentaerythritol may be etherified. It is also possible for the monochlorohydrin to react with the hydroxyl group of a monochlorohydrin molecule already attached to the pentaerythritol molecule to produce an ether chain.

Rosin acids which may be used for esterifying the above alcohols may be any of those ordinarily employed in ester gum formation, such as gum or wood rosin, pure oleorosin, sapinic acids, pimaric acids, abietic acids, and the like, and in fact any of the products which are generally termed "gum colophony." Likewise there may be used polymerized, disproportionated, or hydrogenated rosin, as well as the rosin fractions of tall oil, all of which materials are contemplated within the term "rosin acid."

The rosin acid esters described herein are characterized by good color, extreme hardness, high melting point, and ability to yield excellent varnishes when cooked with oils. They likewise may be employed for the preparation of varnishes with oils ordinarily considered too "soft" for such a purpose. These include oils such as soybean, poppyseed, unbodied linseed, and the like, which, with ordinary rosin esters, do not produce varnishes which dry rapidly to highly resistant films. Moreover, these rosin acid esters are quite heat stable and may be employed in varnish cooking at high temperatures without substantial decomposition or discoloration.

Various modifications of the straight esterification likewise come within the scope of the invention. Thus compositions may be prepared in which the acids are mixtures of rosin acids and unsaturated fatty acids such as those from linseed or soybean or any drying or semi-drying oil. These compositions vary in physical state from a plastic composition to a hard solid, depending on the amount of fatty acids used. These compositions are readily cooked into excellent varnishes when combined with drying oils or with semi-drying oils such as soybean oil which are ordinarily considered too "soft" for varnish preparation. Instead of the higher unsaturated fatty acids such as those from vegetable oils, there may likewise be used lower aliphatic unsaturated acids such as crotonic, acrylic, and the like, or acids such as furoic which contain unsaturated heterocyclic nuclei.

Likewise a polybasic acid or anhydride may be included, such as phthalic or maleic, or any of those commonly employed in the preparation of alkyd resins. By this means it is possible to obtain a much harder product with an even higher melting point than in the case where the dibasic acid is not used. In such compositions acids or anhydrides which contain alpha,beta-unsaturation are preferred.

The rosin esters so obtained are compatible with nitrocellulose and other cellulose derivatives and may be combined with them to obtain valuable resinous compositions. Likewise they may be combined with waxes such as paraffin wax, carnauba, candelilla, and a variety of natural or synthetic waxes to obtain compositions which are harder and higher melting than the original waxes.

The procedure for the esterification may follow any of those ordinarily employed for rosin acid esterification. The rosin is generally melted and the polyhydroxy material may be added all at once or gradually over several hours. Stirring and an inert atmosphere are advisable, and temperatures as high as 300° C. may be employed for periods of time ranging from two to eighteen hours. However, a period of time varying from six to eight hours is usually sufficient to obtain a low acid number. The water of reaction may be removed azeotropically or by bubbling an inert gas through the reaction mixture. The application of a vacuum, especially at the end of the reaction, is likewise advisable. In addition, catalysts such as metallic stearates, acidic catalysts such as zinc chloride, mineral acids, or p-toluene sulfonic acid, and the like, facilitate the reaction.

Example

A mixture of 136 parts of pentaerythritol and 352 parts of 50% aqueous sodium hydroxide was heated to 90° C. after which glycerol-alpha-monochlorohydrin (444 parts) was added with stirring over a period of two hours, during which time the temperature was maintained at 90–100° C. The reaction mixture was maintained at this temperature with stirring for two hours longer whereupon it was diluted with methanol and neutralized with concentrated hydrochloric acid, filtered and the filtrate was concentrated at reduced pressure. The resulting material was extracted several times with absolute methanol and the solvent was removed to obtain a syrup with a hydroxyl content of 29.4%.

Gum rosin of grade WW (298 parts) was melted in the presence of zinc stearate (2.2 parts) and was heated to 190° C. Xylene was present in order to remove the water of reaction azeotropically. The above described condensation product (50 parts) was dissolved in 40 parts of water and this solution was added slowly to the melted rosin. Vigorous stirring was employed. The addition was completed in two and one-half hours, during which time the temperature was raised to 260° C. The reaction was continued for a total of twelve hours, and vacuum was applied during the last hour. The product had an acid number of 11.8 and a ball and ring melting point of 112.5° C.

While various modifications of the above invention have been described, it is to be understood that the same is not limited thereto, but may be varied within the scope of the following claims.

We claim as our invention:

1. A rosin acid ester of a polyhydric alcohol derived from the reaction of pentaerythritol and glycerol monochlorhydrin in an alkaline reaction mixture at an elevated temperature in which the glycerol monochlorhydrin is employed in from 1 to 10 moles per mole of pentaerythritol, the hydroxyl groups of said polyhydric alcohol being substantially all esterified with rosin acid.

2. A rosin acid ester of a polyhydric alcohol derived from the reaction of pentaerythritol and glycerol monochlorhydrin in an alkaline reaction mixture at an elevated temperature in which the glycerol monochlorhydrin is employed in from 2 to 4 moles per mole of pentaerythritol, the hydroxyl groups of said polyhydric alcohol being substantially all esterified with rosin acid.

HAROLD WITTCOFF.
JOHN ROBERT ROACH.

REFERENCES CITED

The following references are of record in the file of this patent:

UNITED STATES PATENTS

| Number | Name | Date |
|---|---|---|
| 1,922,459 | Schmidt et al. | Aug. 15, 1933 |
| 2,409,332 | Woodruff | Oct. 15, 1946 |
| 2,424,424 | Woodruff | July 22, 1947 |